United States Patent
Hardikar et al.

(10) Patent No.: US 6,233,719 B1
(45) Date of Patent: *May 15, 2001

(54) SYSTEM AND METHOD FOR ANALYZING SEMICONDUCTOR PRODUCTION DATA

(75) Inventors: Manoj Hardikar, Saratoga; Steve Zhou, Cupertino; Richard Shiflett; Ashok Kulkarni, both of San Jose, all of CA (US)

(73) Assignee: KLA-Tencor Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,288

(22) Filed: Oct. 27, 1997

(51) Int. Cl.[7] .................................................. G06F 17/50
(52) U.S. Cl. .................................. 716/1; 707/1; 345/333
(58) Field of Search .................................... 364/488, 489, 364/490, 491; 716/1; 707/1, 103, 503; 345/333, 334, 348

(56) References Cited

U.S. PATENT DOCUMENTS

| | | | |
|---|---|---|---|
| 5,047,918 | 9/1991 | Schwartz et al. | 707/203 |
| 5,065,347 | 11/1991 | Pajak et al. | 345/348 |
| 5,201,047 | 4/1993 | Maki et al. | 707/4 |
| 5,226,118 * | 7/1993 | Baker et al. | 345/357 |
| 5,381,470 | 1/1995 | Cambray et al. | 379/216 |
| 5,479,614 | 12/1995 | Aoe et al. | 707/103 R |
| 5,481,741 | 1/1996 | McKaskle et al. | 345/522 |
| 5,483,468 | 1/1996 | Chen et al. | 702/186 |
| 5,519,865 | 5/1996 | Kondo et al. | 707/1 |
| 5,634,133 | 5/1997 | Kelley | 707/503 |
| 5,649,169 | 7/1997 | Berezin et al. | 703/23 |
| 5,675,752 * | 10/1997 | Scott et al. | 345/333 |
| 5,761,064 * | 6/1998 | La et al. | 700/110 |
| 5,802,523 * | 9/1998 | Jasuja et al. | 707/103 |

OTHER PUBLICATIONS

Jim Boyce et al., Using Microsoft Office 97 Professional, Best Sellers Edition, Jan. 1997, pp. 1–1268; see pp. 336–343, 692–695, 697–701, 1023–1029.

* cited by examiner

Primary Examiner—Matthew Smith
Assistant Examiner—Vuthe Siek
(74) Attorney, Agent, or Firm—Carr & Ferrell, LLP

(57) ABSTRACT

A software system and method is disclosed for extending classification attributes in the analysis of production data. The software operates in an object-oriented Windows® environment with increased flexibility because it permits the user to add classifications by dragging and dropping with a computer mouse. Thus, the system can be changed without reprogramming the software code, and is not limited by preprogrammed classifications. The classifications are preferably cluster classifications of defects in semiconductor processing such as scratches, particles, pinholes and blowouts. When a cluster classification is executed, a production map is filtered to remove the non-defect data according to the selected classification; the defect attribute is then readily visible. The filtered production maps may also be color coded for better visibility so that a plurality of corresponding defects in the map are visible in a plurality of corresponding colors. The maps of a plurality of cluster classifications also may be placed side by side for comparison.

24 Claims, 15 Drawing Sheets

SYSTEM AND METHOD FOR ANALYZING SEMICONDUCTOR PRODUCTION DATA

RELATED APPLICATIONS

This application is related to U.S. patent application Ser. No. 08/958,780, filed Oct. 27, 1997, and entitled, "Software System and Method for Graphically Building Customized Recipe Flowcharts," which is hereby incorporated by reference now U.S. Pat. No. 6,097,887.

BACKGROUND OF THE INVENTION

1. Field of Invention

This invention relates to computer software for quality control applications of semiconductor production lines, particularly, a software package for extending namespace classifications in the analysis of production data.

2. Description of the Prior Art

Software packages are increasingly being written for Windows® formats so that a user may interact with the program through symbols on the computer screen via mouse clicks or arrow keys. Such programs are typically written in Visual C++ or Visual Basic programming language, and permit the programmer to call on generalized programming objects to display selectable data input fields. These programs are more user-friendly and afford greater flexibility because the user can choose to select from any one of a large number of program functions based upon displayed visual cues.

Object oriented programming permits a programmer to call upon a particular functional subroutine in Windows® which is modular in design and operable across a large number of different hardware systems. One primary advantage of Windows® is that a great number of programming objects are included in the basic system. Examples of visual objects are the classes of buttons, list boxes, dialog boxes, toolbars, scroll bars, menu bars and title bars. Mouse functions are also enabled. A programmer working within a Windows® environment has access to all of these objects, adding considerable power to his programming abilities.

Quality control has historically relied upon automated computer systems. The automated production line replaces the manual laborer and automated quality control eliminates the inspectors. One important consumer of quality control is the semiconductor industry. Microscopic defects in a semiconductor wafer have major implications on the cost and yield of a semiconductor production process. Because semiconductor technology is so sensitive to defects, isolating their precise source in the production process facilitates great advancement in the industry.

Quality control software packages are currently available for the semiconductor industry, but the programs are generally written on a project-specific basis. These programs are written to include a large number of analytical utilities around a core system but these utilities are essentially fixed in number and the program is difficult to modify. Thus, these packages are expensive and lacking in flexibility.

One method of measuring the number and location of defects in a semiconductor chip involves filtering or erasing the non-defect data from the production data to leave only the defect data. A map of actual production data either may be compared to a map of another set of actual production data, or to a map of an ideal set of production data stored in the computer memory. The defect data is then analyzed according to number, density, location, type and step in the production process, with the goal of correcting the production process itself. The defect data may give clues about how to increase the yield and decrease the cost of the product.

A variety of prior art data analysis systems and methods have been disclosed for industrial process control of semiconductor manufacturing. Among these is U.S. Pat. No. 5,226,118 to Baker et al. This patent discloses a system for making charts. The charts are displayed as a gallery of cells where each cell is a unit of a two dimensional array. Each cell in the chart may be defined as a mathematical function of one or more other cells in a manner similar to a spreadsheet program such as Microsoft Excel.®

Other related patents are U.S. Pat. Nos. 4,967,381; 4,951,190; 4,873,623; 4843,538; 4,805,089; and 4,679,137. These patents disclose a complex multilevel set of data structures. While the control parameters can be changed to some extent by the engineer, the set of parameters is predefined by the software package. Moreover, not all parameters can be changed, and the extent to which a given operator may change them depends upon the operator's level of authorization. These systems are somewhat primitive because they do not recognize the flexibility afforded by object-oriented visual programming.

SUMMARY OF THE INVENTION

The present invention concerns a software system and method for extending cluster classifications for an analytical routine of production data. The user selects a new classification from a list box and adds the new classification to a table namespace of old classifications by dragging and dropping with a computer mouse. The new cluster classification is a namespace with attributes for executing the analytical routine of this cluster classification.

The set of classifications in the table namespace is executable for graphically displaying analytical results in a Windows® environment. The particular classifications are clusters of defect data in a production map. Examples of features identified by these cluster classifications are scratches, particles, pinholes and blowouts. Execution of a particular cluster classification filters the production data so that only a map of the particular defect of the cluster classification remains. The attributes of the classification cluster may also retrieve an analytical routine across a local network or the Internet so that new cluster classifications may be added from other fabrication plants.

Charts, such as Type Pareto or bar graphs, are produced by the analytical routines of the cluster classifications through their attributes to analyze data from production runs based upon production functions. The software permits the user to color code the defects in each cluster classification for easy identification. A user may move from one page of a filtered production map to another page, or place two pages side by side for comparison in order to look for patterns establishing where the production defects arise. Thus, the pattern of defects on a given map may be visualized more easily.

DETAILED DESCRIPTION OF THE PREFERRED EMBODIMENTS

1. Chart Generation

Figure 1:
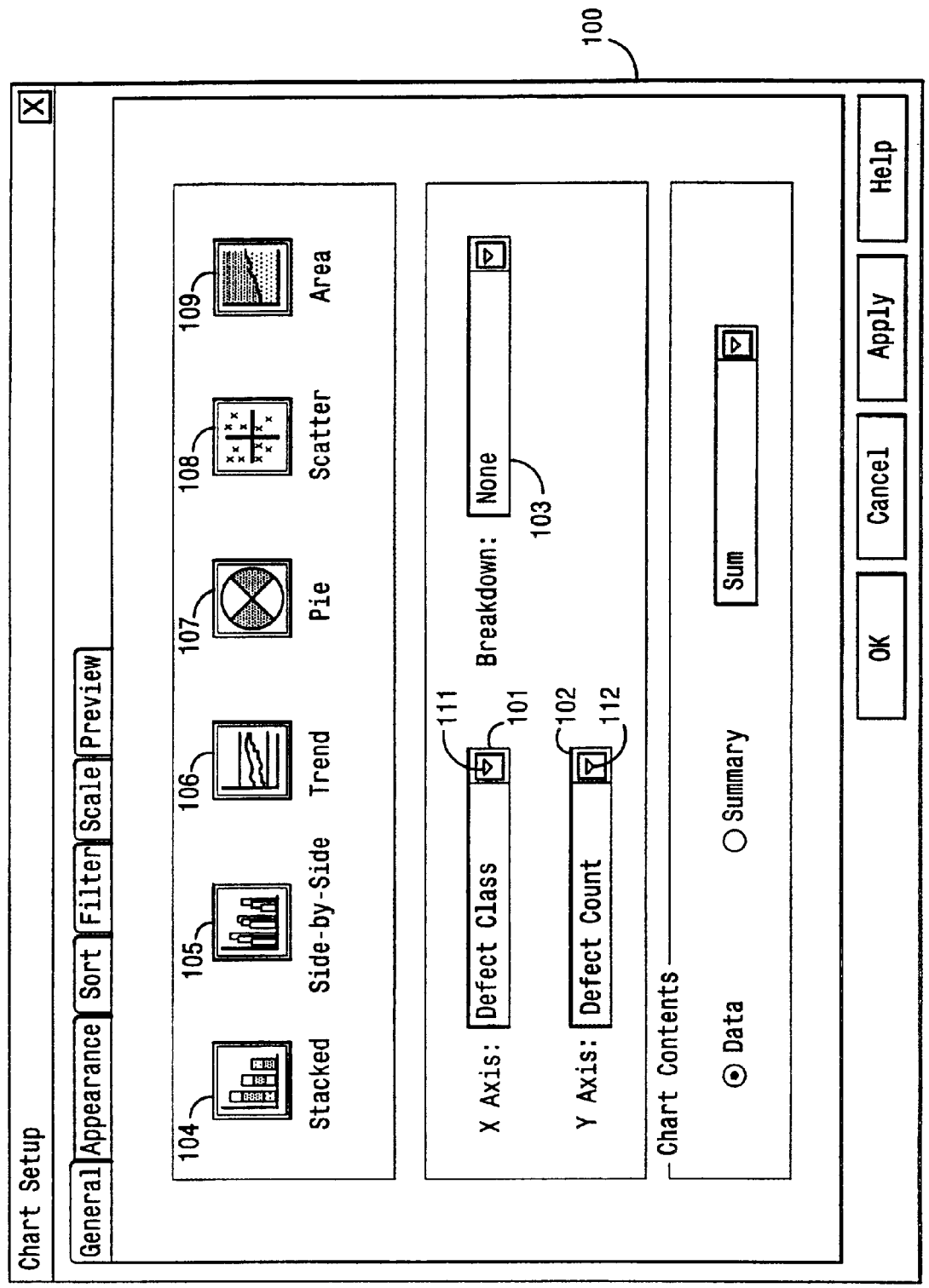
FIG. 1 illustrates a computer screen for specifying data analysis parameters.

FIG. 1 illustrates a computer screen 100 having one or more dialog boxes 101. 102, 103 for specifying data analysis parameters. Drop-down list boxes 101, 102 indicate which parameters are to be placed on the x- and y-axes of the bar chart. The parameters are selected with a computer mouse from a drop-down menu or similar type of dialog box 101, 102. The user clicks on any of the parameters in the menu of the dialog box 101 or 102 to select the data analysis parameters on the x- and y- axes.

Preferably, the dialog box 101, 102 is a drop down list box with a vertical scroll bar. The user causes the list box 101, 102 to drop down by clicking on the arrow box 111, 112 beside the list box 101, 102. The user clicks on one of a collection of text strings representing production variables and production functions within a columnar list within the list box rectangle. When the desired text string is found within the list box 101, 102, the user clicks on this text string which causes it to appear in the selection line of the list box 101, 102.

One feature of the present invention is the recording of the selected production variables and production functions in a macro feature. The computer thus remembers or learns the selection of variables and functions selected by the user, and has the capability of replaying the particular variables and functions for a new data set. The analytical system and method therefore differs from the prior art where new production parameters must be specified each time an analysis is to be performed, or where the user is restricted to choosing from only a specified set of preprogrammed analytical schemes. The macro feature stores the particular set commands relating to the production parameters that the user has previously selected from the dialog boxes and drop down list boxes 101, 102.

Parameters applicable to monitoring production defects might include number on the y-axis and type on the x-axis. A Type Pareto Chart is then created and displayed. For example, the number of defects in a semiconductor assembly line is selected as the parameter on the y-axis. The x-axis parameter is selected from a list including defect size or dates of production.

Figure 2A:
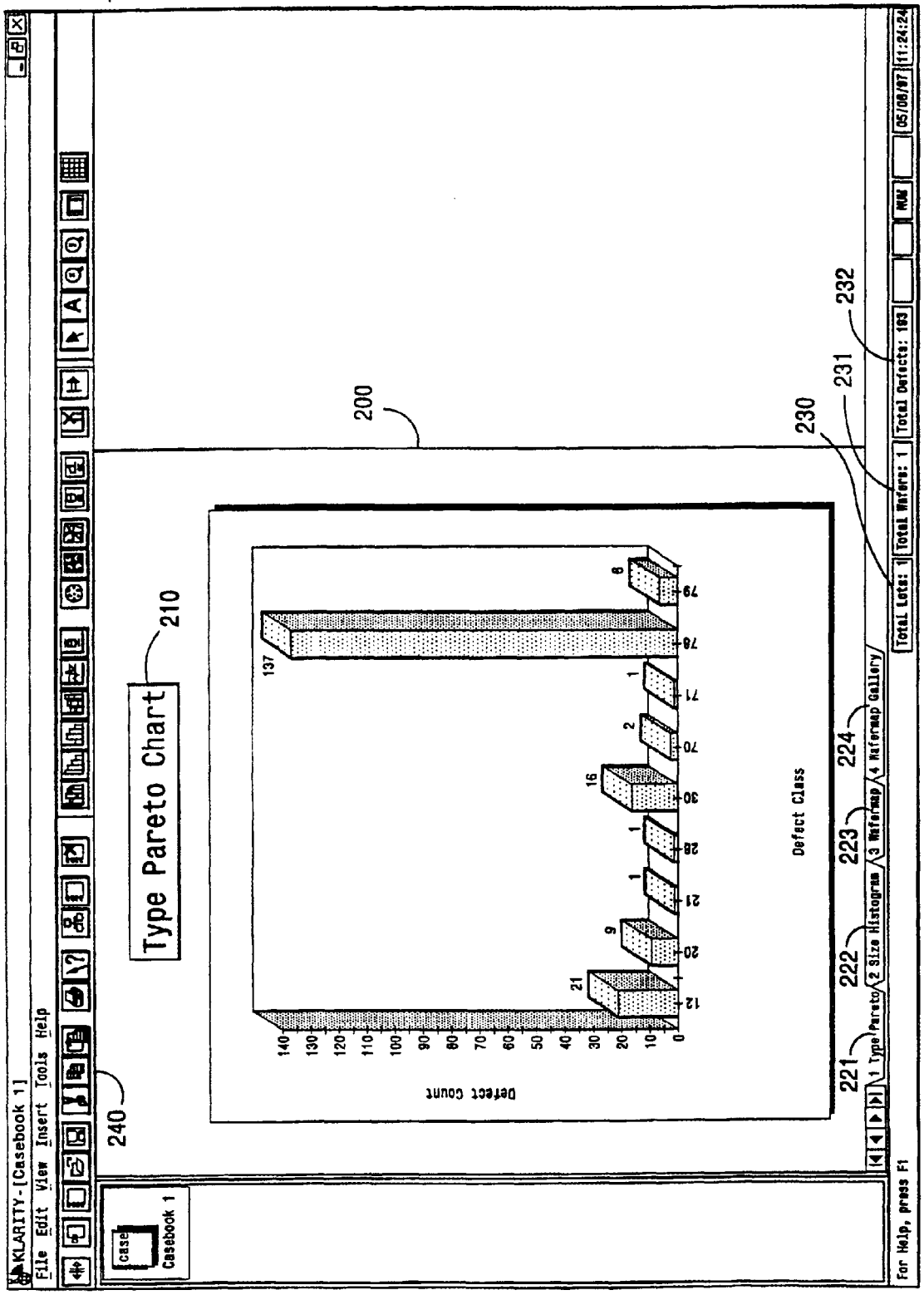
FIG. 2(a) shows a bar chart histogram produced by the software.

FIG. 2(a) shows a Type Pareto Chart 200 of the number of defects by defect class. An appropriate title bar 210 may be found above the window, in this case reading "Type Pareto Chart." At the bottom of the screen are tabs 221, 222, 223, 224 indicating a number of pages that are immediately accessible to the user. In FIG. 2(a), the pages are labeled "1 Type Pareto," "2 Size Histogram," "3 Wafermap," and "4 Wafermap Gallery." By clicking on these tabs at the bottom of the page, the user can move from page to page. Smaller boxes at the bottom of the window 200 give other information such as the total number of lots 230, total number of wafers 231 and total number of defects 232. A toolbar 240 at the top of window 200 has various buttons providing further selections, such as accessing other bar charts, the wafermap of FIG. 4(a), or the flow chart generating window of FIG. 5(a); toolbar 240 further provides buttons for changing the magnification of the bar charts, or for producing the calendar of FIG. 2(b).

Figure 2B:
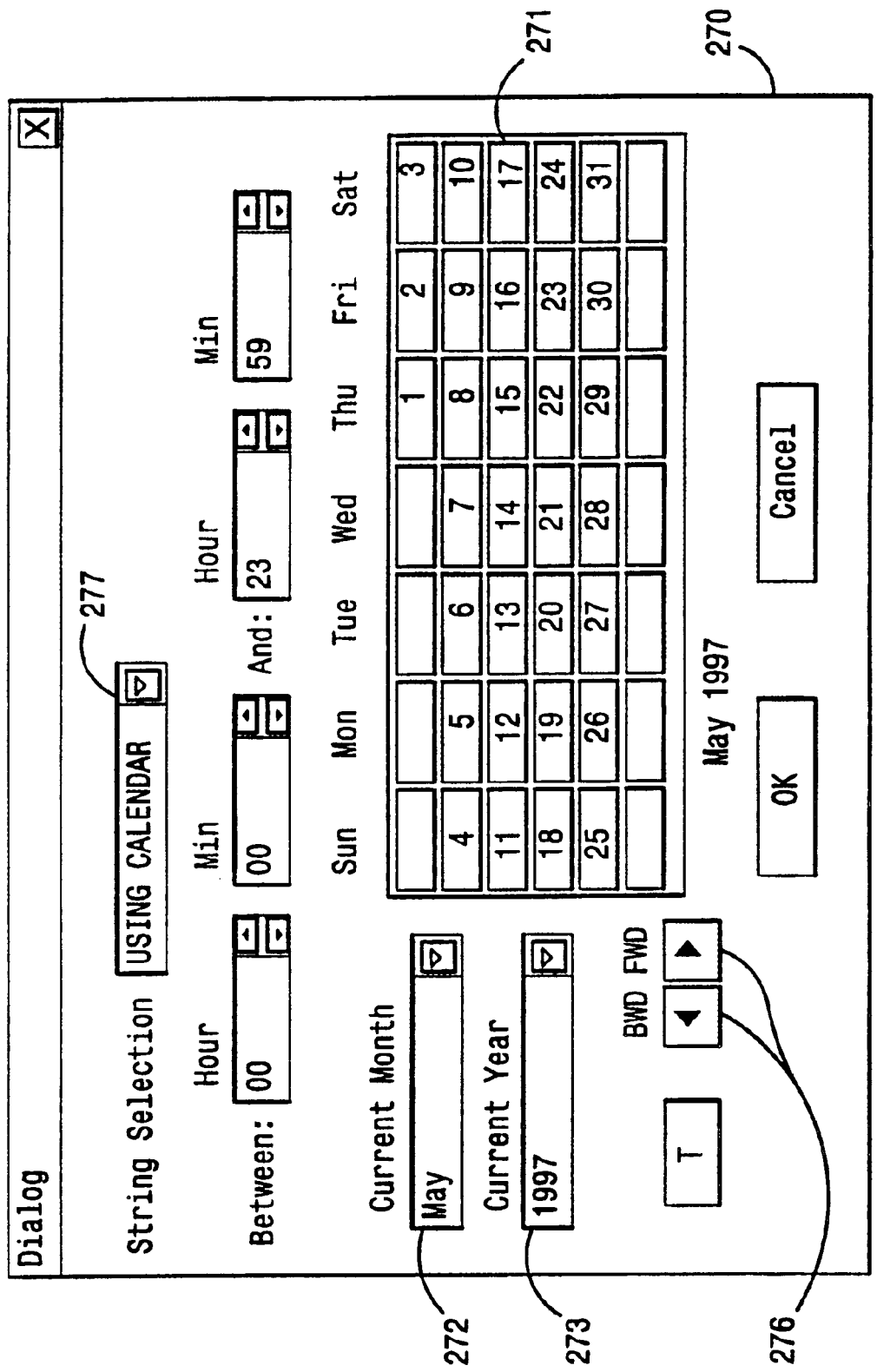
FIG. 2(b) shows a calendar produced by the software.

In order to produce the chart of FIG. 2(b), the software package for creating the bar charts 200 of FIG. 2(a) includes a dialog box button 241 in the toolbar kit 240. Dialog box 250 appears including a string selection drop down list box 277 shown in FIG. 2(b). The user then selects the method of entering dates from the string selection box 277. When the user chooses that the dates are to be selected using calendar 270, a month and year for the calendar 270 are selected from additional drop down list boxes 272, 273. Alternatively, the customer may use the string selection box 277 to enter the production variables in another manner, such as from a list box of text string, e.g. "last ten days," "last ten lots," or input a range of dates from the keyboard in a blank field box. FIG. 2(b) further shows that calendar display 270 includes a plurality of push buttons 271 for each day of calendar 270. The user selects one or more push buttons 271 on the calendar 270 to indicate one or more days over which the production data is displayed in the bar chart format. It is also possible to select times within a given calendar date by the hour and minute with dialog boxes 274, 275, or page through the calendar month by month with arrow keys 276.

Figure 3:
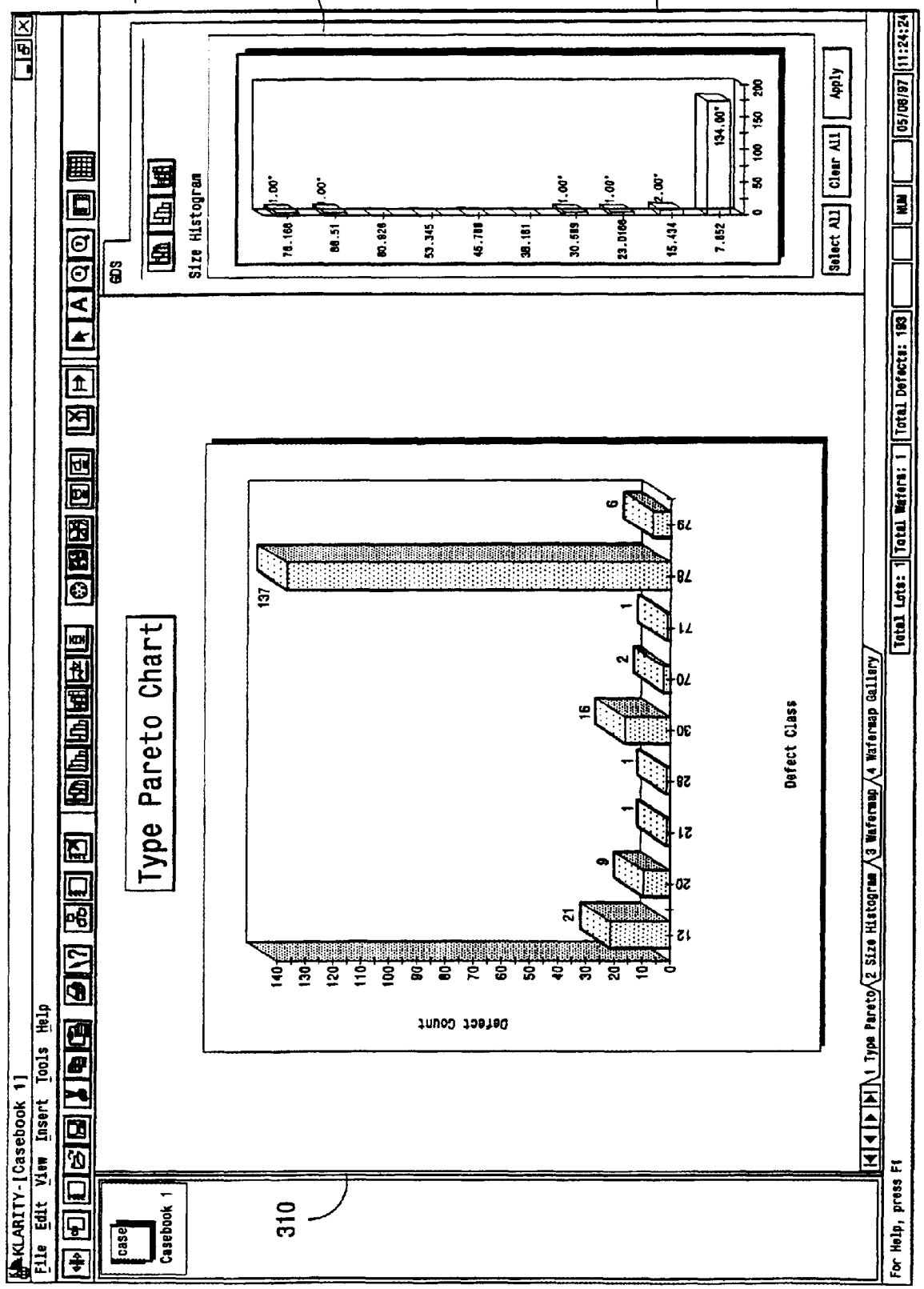
FIG. 3 illustrates a display window where two or more bar charts are placed side by side for comparison.

Referring now to FIG. 3, the software package includes a toolbar kit function that lets the user place two or more bar charts 310, 320 side by side for comparison by splitting the window 300. For example, the user has the capability of comparing a bar chart 310 of the number of defects by layer number for a first production lot relative to a similar bar chart 320 for a second production lot. The bar charts 310, 320 can be created as embedded packaged objects which can be dragged and dropped into another window, or the bar charts 310, 320 can be stored as files. The packaged object may be represented as an icon or other graphic image. The various pages are color coded for easier visibility.

2. Accessing Production Maps

Figure 4A:
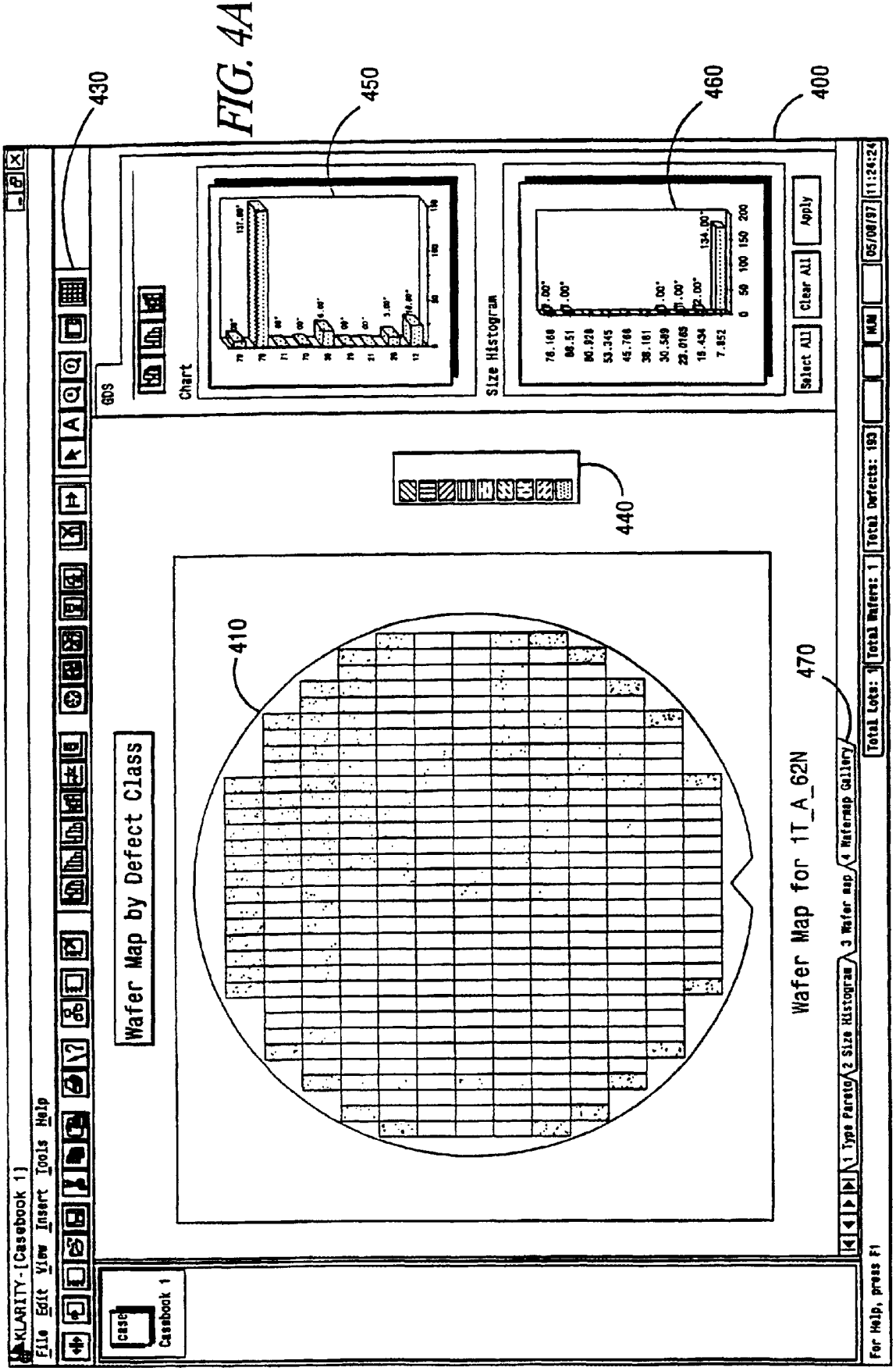
FIG. 4(a) shows a zoom feature on the software package for viewing production data.

Referring now to FIG. 4(a), the software package of the present invention includes a utility for accessing and displaying a production wafermap 410 in display window 400. The user zooms in or out on the production map by selecting a plus or minus zoom button bar 430. Each of the particular defects is color coded to facilitate visual identification in accordance with a defect number scale 440 to the right of map 410. Side-by-side with the wafermap, are shown Type Pareto and Size Histogram charts 450, 460 imported from windows 310 and 320 of FIG. 3.

The actual production map is compared to a production map in a wafermap gallery to filter out all patterns except for defects. The user drags and drops a packaged image of the production map 410 with the computer cursor into one of the maps in the wafermap gallery. The actual and ideal production maps in wafermap gallery represent the way a particular product would appear if the product has no defects. A map 480 of the product without defects is accessed by selecting the tab 470 at the bottom of window 400 to page into wafermap gallery window.

Figure 4B:
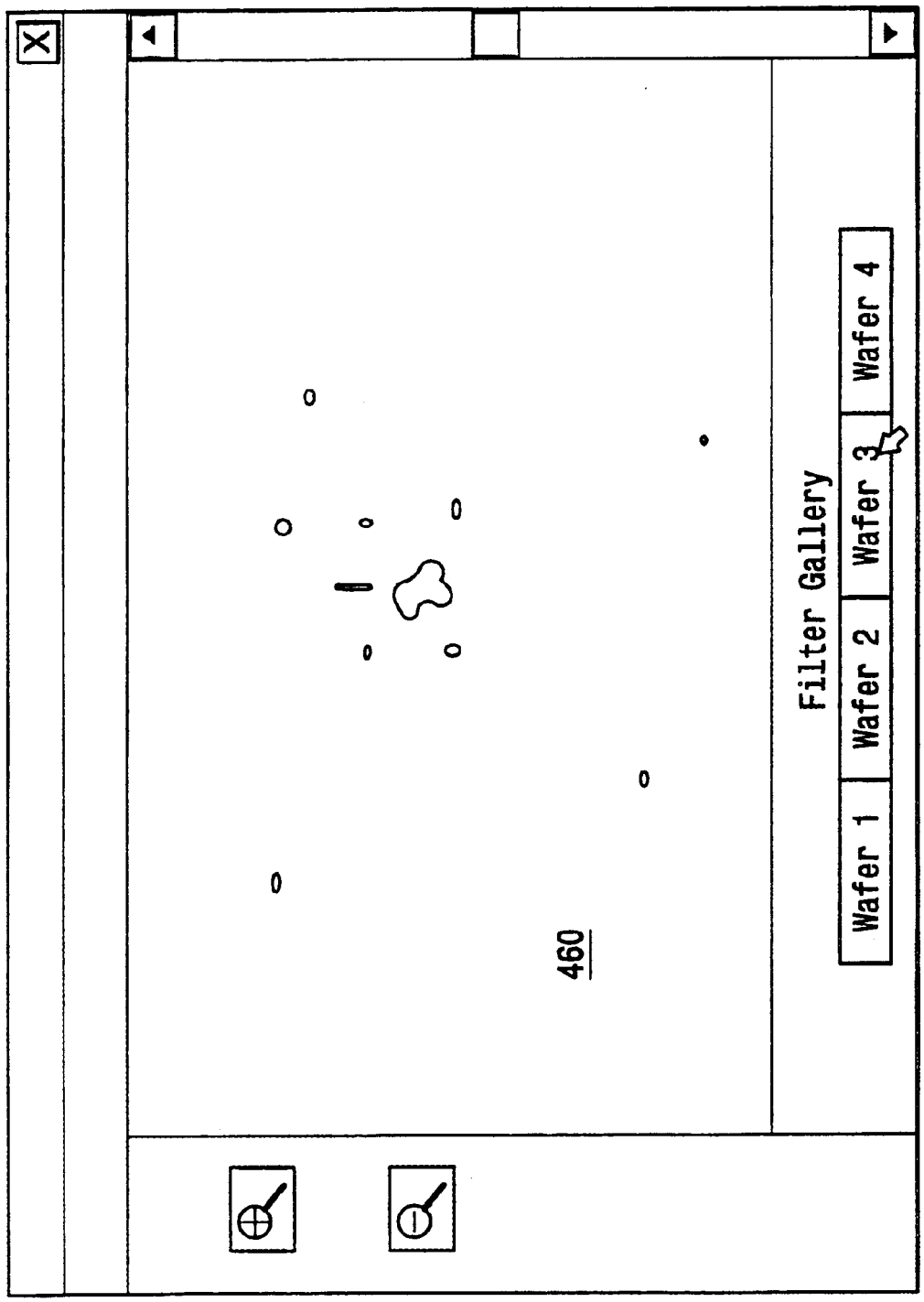
FIG. 4(b) shows a production map after filtering.

FIG. 4(b) shows the production map 440 after it has been filtered by information in the wafermap gallery 470. Once the actual production map 410 is subtracted from the ideal production map of the wafermap gallery 470, only a map 460 of the defects remains. By combining the selection of production parameters with filtering from the wafermap gallery 470, the user identifies the defect pattern in a particular lot number or layer number.

3. Creating Flowchart Recipes

Figure 5:
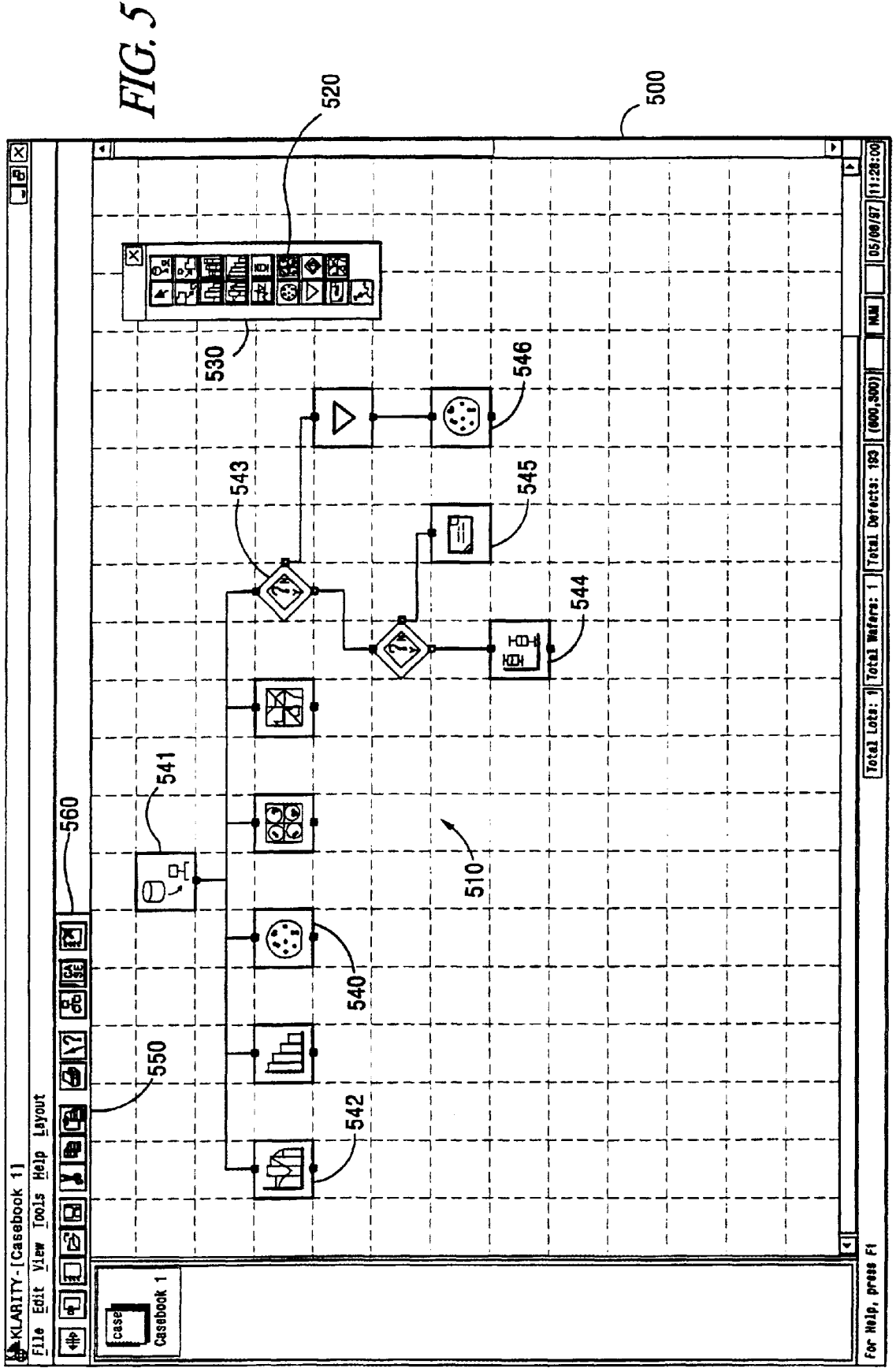
FIG. 5 shows the display window of a flowchart created by the software package.

Referring to FIG. 5, the invention further includes a program function for building a customized flowchart 510 according to a selected recipe of conditionals. A conditional in this context is defined as an event that occurs or does not occur depending upon another value. This value may be one of the production parameters from production data or a calculated result of some previous production function. A conditional produces one or more branches in a flowchart depending upon this value. The recipe of conditionals is a series of linked conditionals that is created by the user according to a desired data analysis and response scheme.

The flowchart building program function operates in the manner of a "macro" in a computer by recording keystrokes in the casebook and playing back the keystrokes of the casebook upon command from the user. The "macro" type program function of the present invention remembers a series of production parameters specified by the user from the dialog boxes.

The casebook macro is subsequently converted into flowchart 510 by the software and displayed. Each of the selected production parameters and production functions is assigned a geometrical element in the flowchart depending upon its function, e.g. box, circle, diamond. The geometrical elements of the flowchart correspond to their standard definitions in flowchart lexicography; a circle is an input-output function, a diamond is a branching conditional, and a box is a data calculation. As shown in FIG. 5, the user can also create the flow chart by dropping and dragging a node 520 from a dialog box 530 and linking it to one of the previous nodes 540 in the flow chart 510. Whenever the user wishes to execute a particular analytical scheme on the production data, he selects a particular flowchart 510 from the current page by pressing a particular button 550 on the toolbar 560. The recipe represented by the flowchart may be readily modified by the user by re-recording the conditional selections, redisplaying a new flowchart, and reexecuting the new flowchart more directly via the node dialog box 530.

The user may wish, for example, to execute on a regular basis a flowchart 510 that produces the standard deviation of defects in the second layer of the product for the last ten days. This particular flowchart 510 has been previously created and recorded by the user. Each of the pages in the casebook has a corresponding graphical node symbol 541, 542, 543, 544, 545 and 546 which is displayed in the window 500 upon selection. After this flowchart 510 is created, it is displayed in a linked fashion in the display window 500 as shown in FIG. 5. The user then generates one or a series of bar charts as shown in FIG. 2(a), or performs other functions by selecting this particular flowchart 510 in the display window 500.

An analytical subroutine represented by the flowchart may be automatically executed by the user on a regular basis. Generic groupings of production data such as "last ten days" or "last ten lots" are specified rather than dates certain. This analytical subroutine is then executed, say, every week or every two weeks, without operator intervention. Reports of one or more of these analytical schemes are then automatically generated at these times. The reports may be generated automatically either at the operator's computer, where they are stored in data files, or at a print station. The operator specifies the number of copies of these reports to generate, and the location that they are generated is selected via the network printer.

A plurality of these reports are automatically published on a preestablished regular basis without taking up the operator's time on every occasion. Copies are routed to selected individuals responsible for overseeing production. Alternatively, instead of printing these reports on a network printer, they can be routed on a regular basis in an electronic format through a network server. The network can be either a local area network or an Internet location on the World Wide Web. Electronic publishing has the advantages of conserving paper and reducing costs.

It is also possible to automatically utilize the results of the previous data analysis subroutine to conditionally change the scheme of the data analysis, and the subsequent publication of the reports. If a condition is detected where the results of a particular analysis exceed a preset value, then other predetermined analyses are performed to more precisely identify the source of the defect. Effectively, a feedback loop is set up to maintain tight control between the inspection results and the analytical scheme. When the results of an analysis exceed predetermined control levels, a notification may be sent to the engineer through e-mail or pager systems to take a specified remedial action. A report might also be sent back to the production line to automatically initiate a process change, e.g. across the Internet to launch a Java applet. Thus, the analytical tool of the present invention is more than just a data gathering mechanism since process control can be implemented automatically via a feedback loop.

One application of the analysis routine of the present invention is to determine when a defect is an "adder," i.e. a defect that is not present on any previous layer. These adder defects are subtracted from the defects that were present on the previous layers, and then classified by the Automatic Defect Control (ADC) program.

4. System Architecture

Figure 6A:
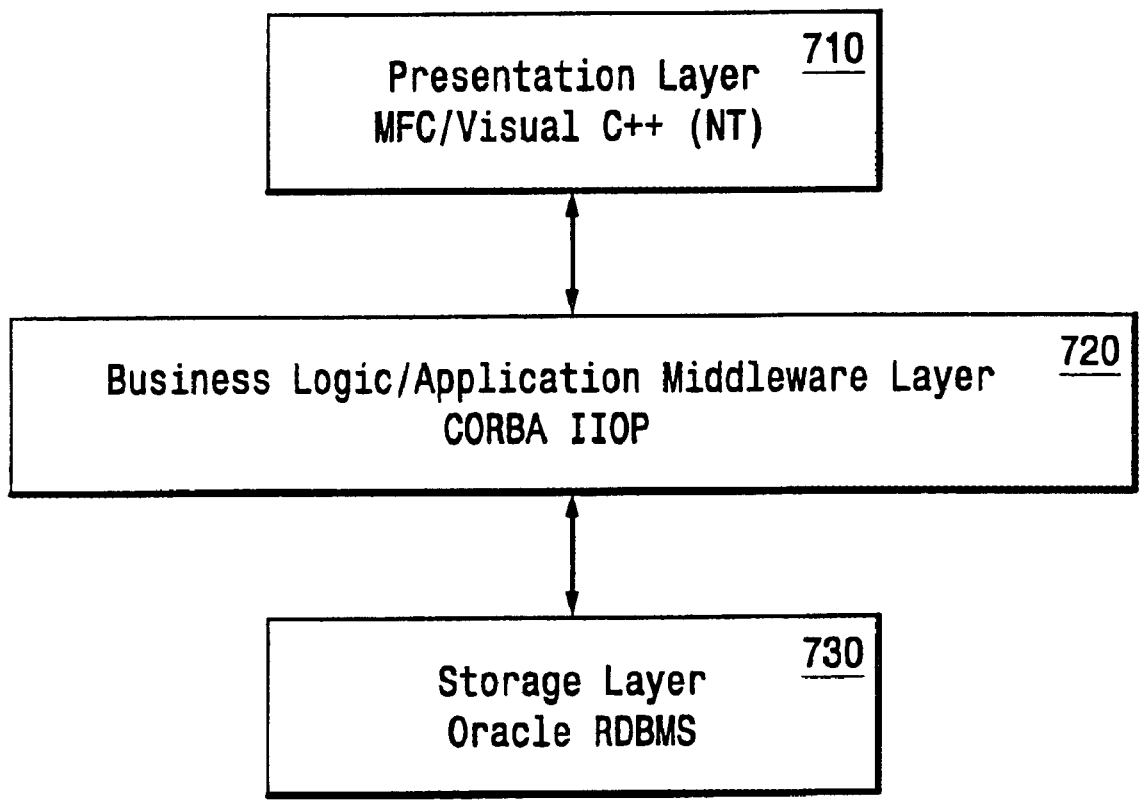
FIG. 6(a) illustrates the overall system architecture.

As shown in FIG. 6(a), the software system of the present invention utilizes a three-tier architecture. The highest tier 610 is the Presentation Layer, the object-oriented Windows® environment consisting of the menus, buttons, dialog boxes, and charts that are visible to the user. The middle tier 620 is the CORBA (Common Object Request Architecture) IIOP (nter-Internet Object Protocol) Middleware Layer, which distributes objects across servers and the Internet. The lowest tier 630, the Storage Layer, is a database containing raw production data which is connected by the CORBA Layer to other servers and the Presentation Layer.

Figure 6B:
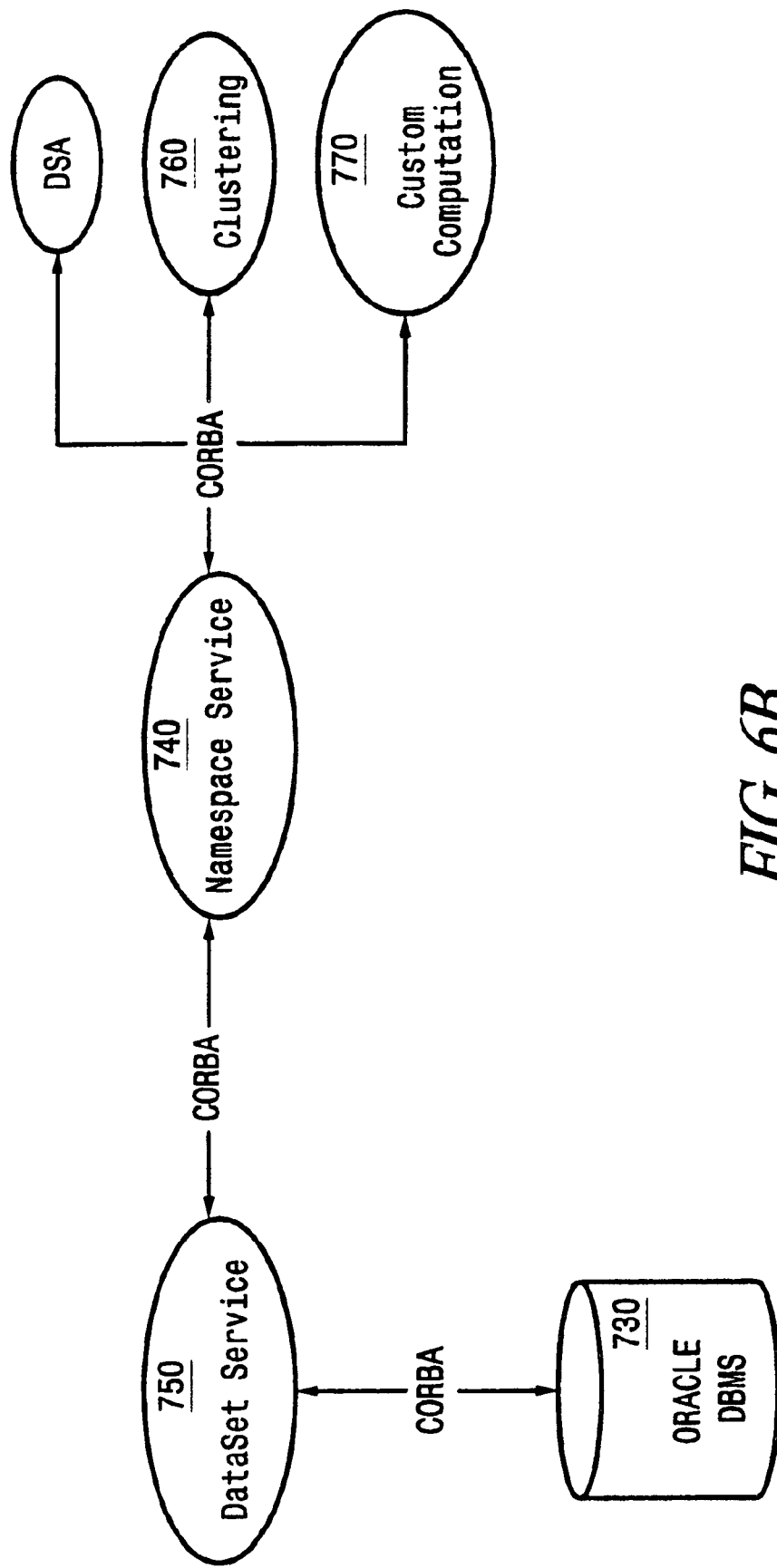
FIGS. 6(b) and 6(c) illustrate the interfaces of the middle layer architecture.

FIG. 6(b) shows how the CORBA Middleware Layer interfaces with the Storage Layer 630 and the Namespace Service 640 to modify of the cluster classifications. CORBA is a mechanism of distributing objects across microcomputers and operating systems. The CORBA Middleware Layer provides access to the Server for objects that can reside anywhere on the network so that new cluster classifications can be presented from the Namespace Service 640 to the DataSet Service 650. One client in Ireland may, for example, discover a new method of clustering 660 or custom compilation 670 of the data in that location. This method may be relevant to the needs of a client in the United States. CORBA takes the Namespace Service 640 from the client in Ireland and applies it to the DataSet Service 650 from the United States over the server without having to access the production database in the United States to perform the analysis.

Figure 6C:
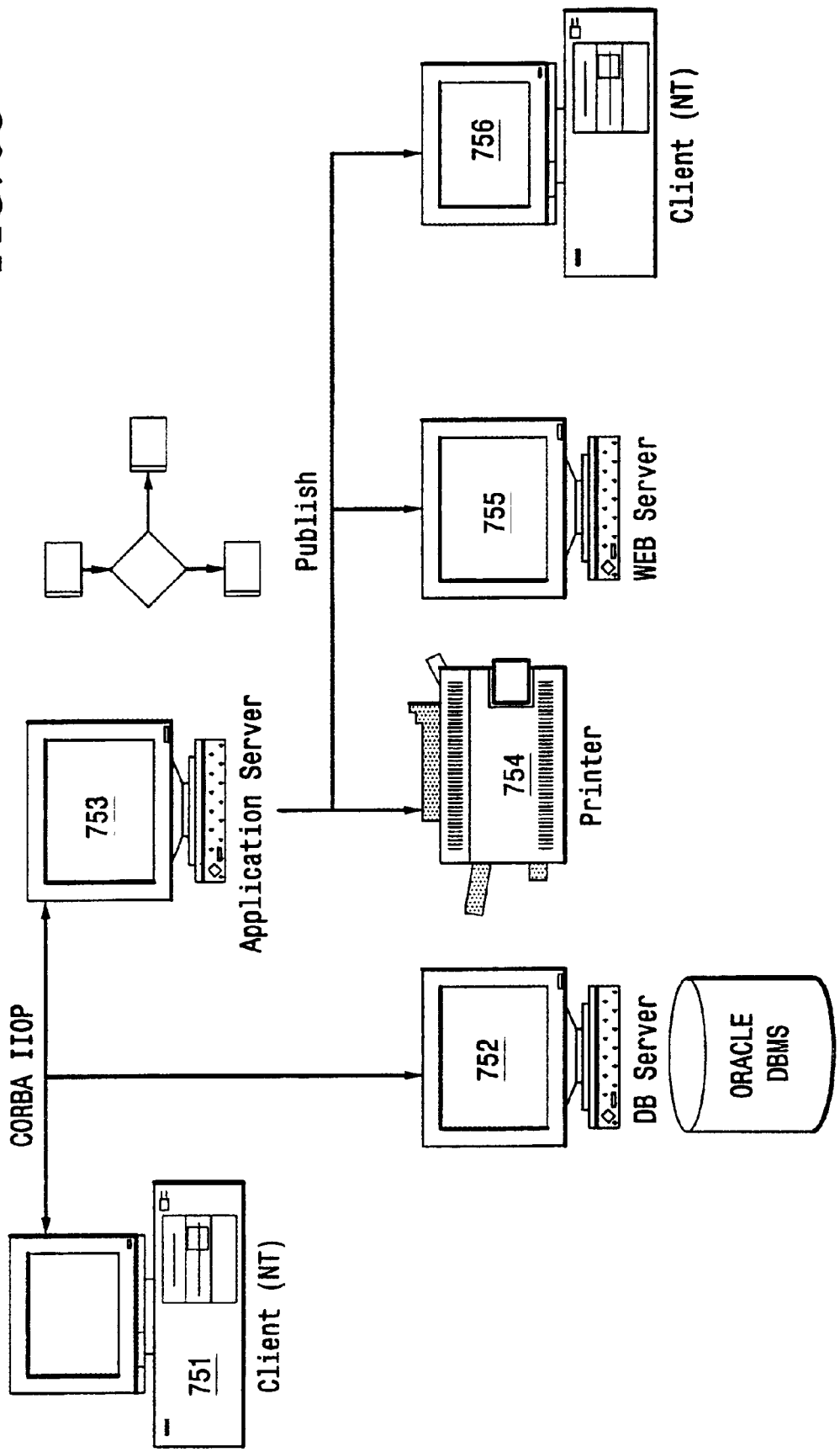

FIG. 6(c) shows how CORBA interfaces via the server from the client's personal computer 651 to other work stations and the Database Server 652. The Application Server 653 stores and distributes all of the various calculation modules or objects. The Application Server 653 can be the same as the Database Server 652, it can be the Client workstation 651, or anyplace else on the network. The recipes are contained in the Application Server 653, and once the recipes are run, the results can be published at a printer 654, WEB Server 655 or client personal computer 656.

Figure 7:
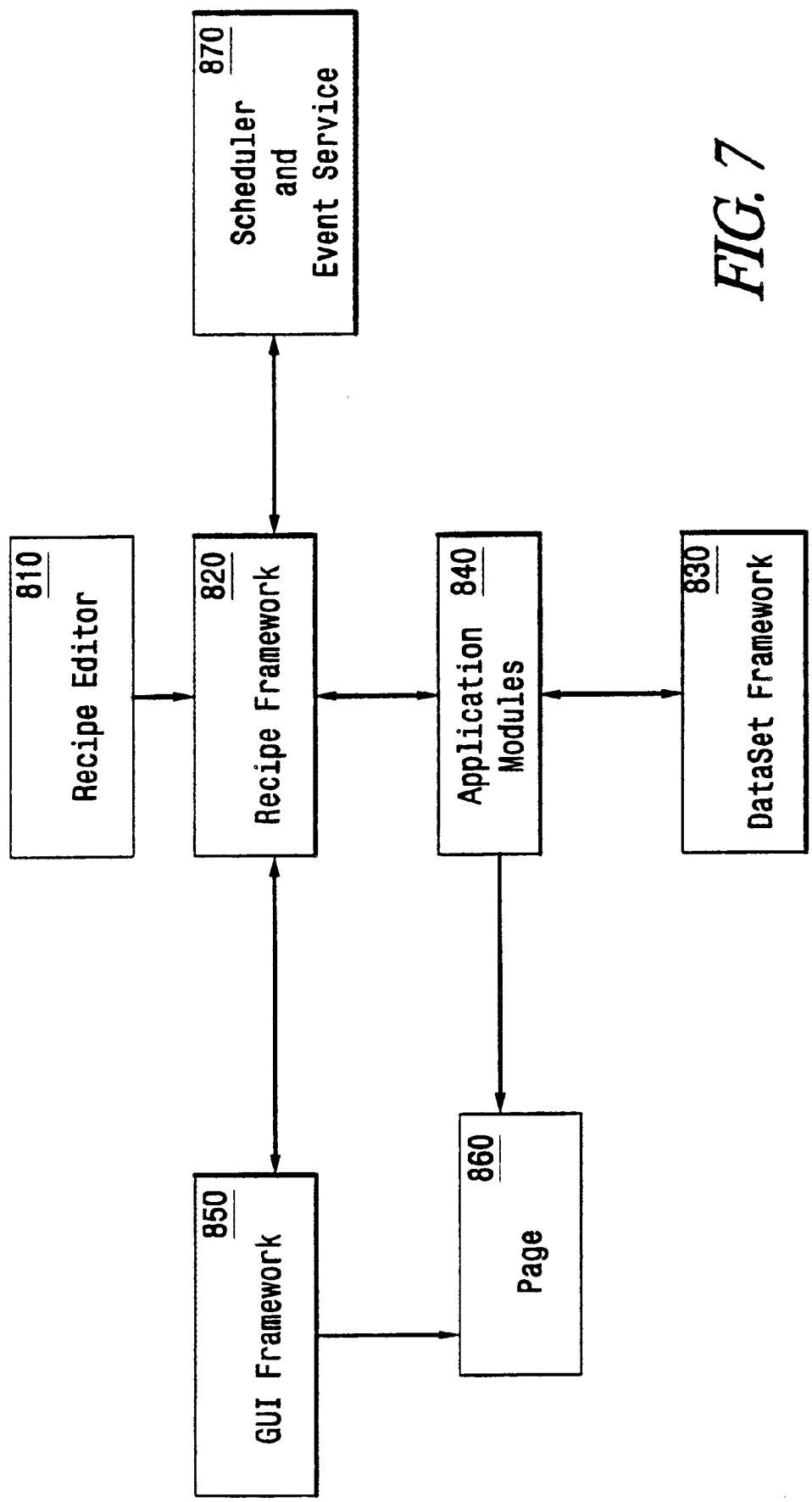
FIG. 7 illustrates the operation of the higher level software.

FIG. 7 shows a detail of the software architecture of the Presentation Layer, written in Visual C++ programming language. The Recipe Editor 710 permits the user to create a Recipe Framework 720. The recipe is applied to the DataSet Framework 730 through the Application Modules 740, and with the Graphic User Interface (GUI) Framework 750, a Page 760 is produced in the Windows® format. The Recipe Framework 730 also interfaces with the Scheduler and Event Service 770, providing automatic execution and publication of production data analyses at future specified times.

Once the analytical routines are performed, the results are displayed in a graphical representation such as a bar chart, graph or filtered production map. Each cluster classification is displayed in a color coded format for greater visibility. For example, a filtered production map is produced with scratches color coded in red, particles in blue, and pinholes in green. Or, bar charts are created and placed side by side on the computer screen for comparison, with one bar chart representing the standard deviation of scratches in lot one for the last ten days color coded in red, and a second bar chart representing the standard deviation of pinholes in lot one for the last ten days color coded in green.

5. Extending Classifications

Optical pattern recognition systems exist to permit a computer to classify certain types of defects. For example, a defect such as a scratch exhibits certain familial similarities to other scratches, i.e. the defect is long and thin. By abstracting the characteristic similarities of this class of defects, the computer recognizes and classifies based upon the abstracted characteristics. However, the various classes of defects that prior art pattern recognition systems can identify is typically fixed by the particular software program. It thus becomes desirable to be able to add new defect classifications when they become identifiable.

Defects often are present in groups or clusters since the causative factor leading to the defect is repeated in a general area on the wafer. These defect groups are referred to as cluster classifications. The optical pattern recognition system, working with a neural network computer, is capable of identifying these cluster classifications in a production map. Each cluster classification represents a filter that makes visible only the defect of that cluster classification. A plurality of defect filters may be applied in sequence so that only the applied combination of defects are operated on by a particular data analytical routine.

The present invention includes a software procedure for integrating and extending attributes of new cluster classifications into a namespace for an analysis routine. In this context, a namespace is similar to a filename but contains additional executable attributes that tell the operating system to perform predetermined operations because of the namespace extensions. An example of a namespace with attributes is a Word, file with a ".doc" extension. The ".doc" extension signals the operating system to do something when the user clicks directly on the filename, specifically to open the document in Word.® Otherwise, the user must first start the Word® word processing program, then click on the Open File list box on the title bar, then select the proper drive, and finally use the scroll bar to find and click on the correct file. The ".doc" extension is an attribute that tells the computer to perform these tasks when the filename is selected, considerably simplifying the execution. The namespace is a collection of files represented by the filename including associated executable or other file types, these files running when the filename is selected.

Figure 8A:
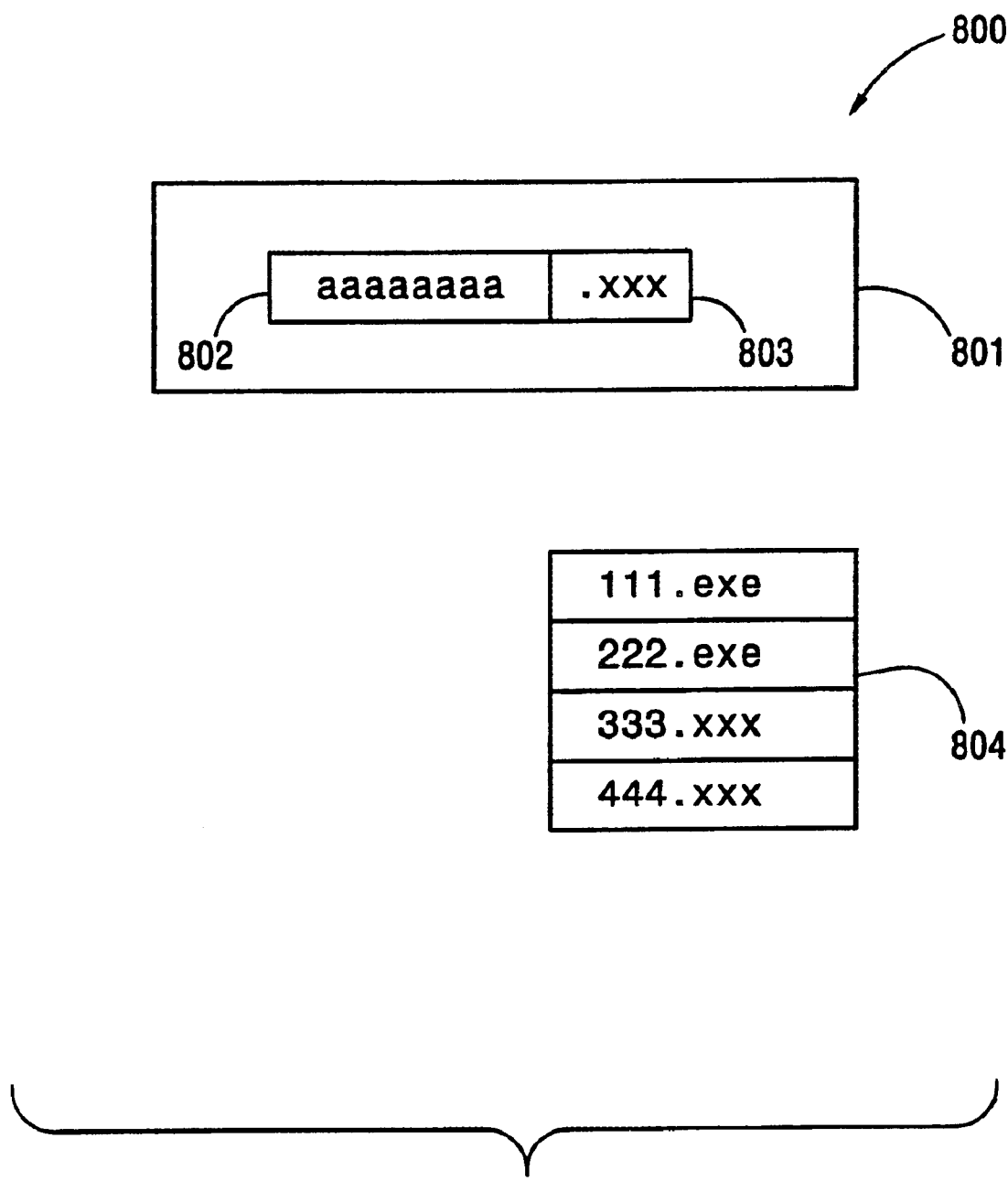
FIG. 8(a) a format for a namespace.

FIG. 8(a) shows the essential format of the namespace datafile. Cluster classification 800 has a namespace 801 with a filename 802 and an attribute 803. Attribute 803 has a definition 804 consisting of a number of executable and other type files 805. In this instance, files 805 cause the operating system to look for other files 805 that retrieve procedures for executing an optical pattern recognition, filtering and display of data analysis in charts.

In the present invention, the attributes of the cluster classification namespace include associated executable utilities for semiconductor defect analysis. Examples of attributes contained by this namespace include (1) the series of commands associated with executing the optical pattern recognition program performed by the neural network, (2) the series of commands associated with performing an analytical scheme on the data collected from production lots, layers, dates, etc., and (3) the series of commands associated with importing and running a data analytical scheme that is stored elsewhere on a network (e.g., via the Internet at a foreign subsidiary manufacturing plant or an intranet from another user's hard drive).

Figure 8B:
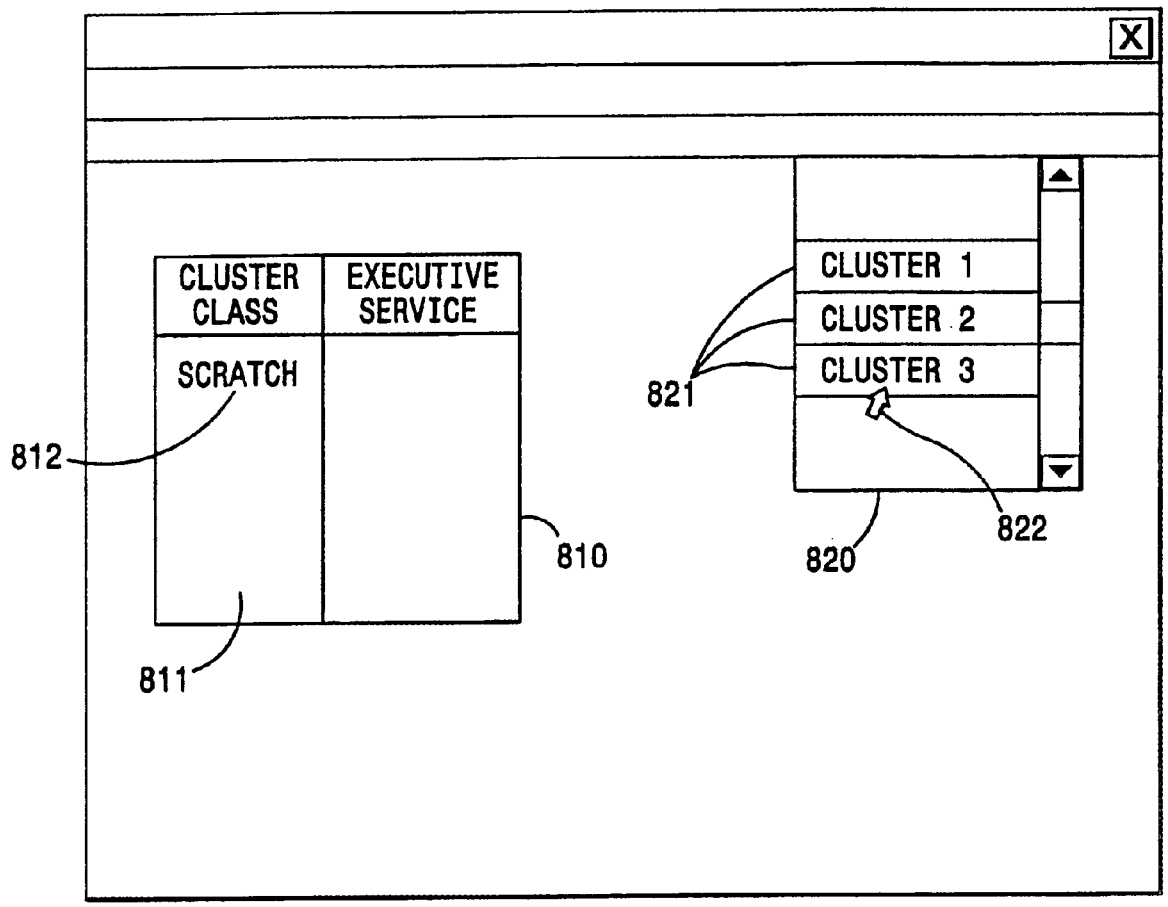
FIG. 8(b) shows a list of cluster classifications for analyzing defect data and a list box for adding cluster classifications.

Referring to FIG. 8(b), the extension is applied to cluster classifications of semiconductor defects. The program contains a table namespace 810 of defect cluster classifications 811. The attributes of this namespace 810 include one or more executable or other type files telling the computer what do to when the cluster classification namespace 811 is click-selected with the computer mouse. These cluster classes 811 include such semiconductor defects 812 as a scratch, particle, blowout, pinhole, etc., or the defects may be classified by size. When a scratch cluster classification namespace 812 is selected by the user with the cursor, the attributes of the scratch namespace 812 are executed to start the neural network pattern identification procedure, to retrieve the data analysis parameters of the data analytical scheme, to execute this data analysis scheme, and to import any program or data files across a network as required.

FIG. 8(b) further illustrates a list box 820 for adding cluster classifications to the table namespace 810. The list box 820 is a drop down list box with a plurality of prospective cluster classifications 821. The user clicks on the drop down list box 820 with the computer cursor 822 to select one of these cluster classifications 821, and this classification 821 is added to the left column 811 of the table namespace 810. The new cluster classification 821 is preferably moved from the drop down list box 820 to the table namespace 810 by dragging and dropping the new cluster classification 821 with cursor 822. The user thereby has a greater degree of flexibility to insert new attributes 803 into the namespace 810 than would be possible with a static software package. Upon execution of the cluster classification 821, the user filters the production map so that only the scratch data remains. Analysis of the scratch data can then be readily performed.

Figure 8C:
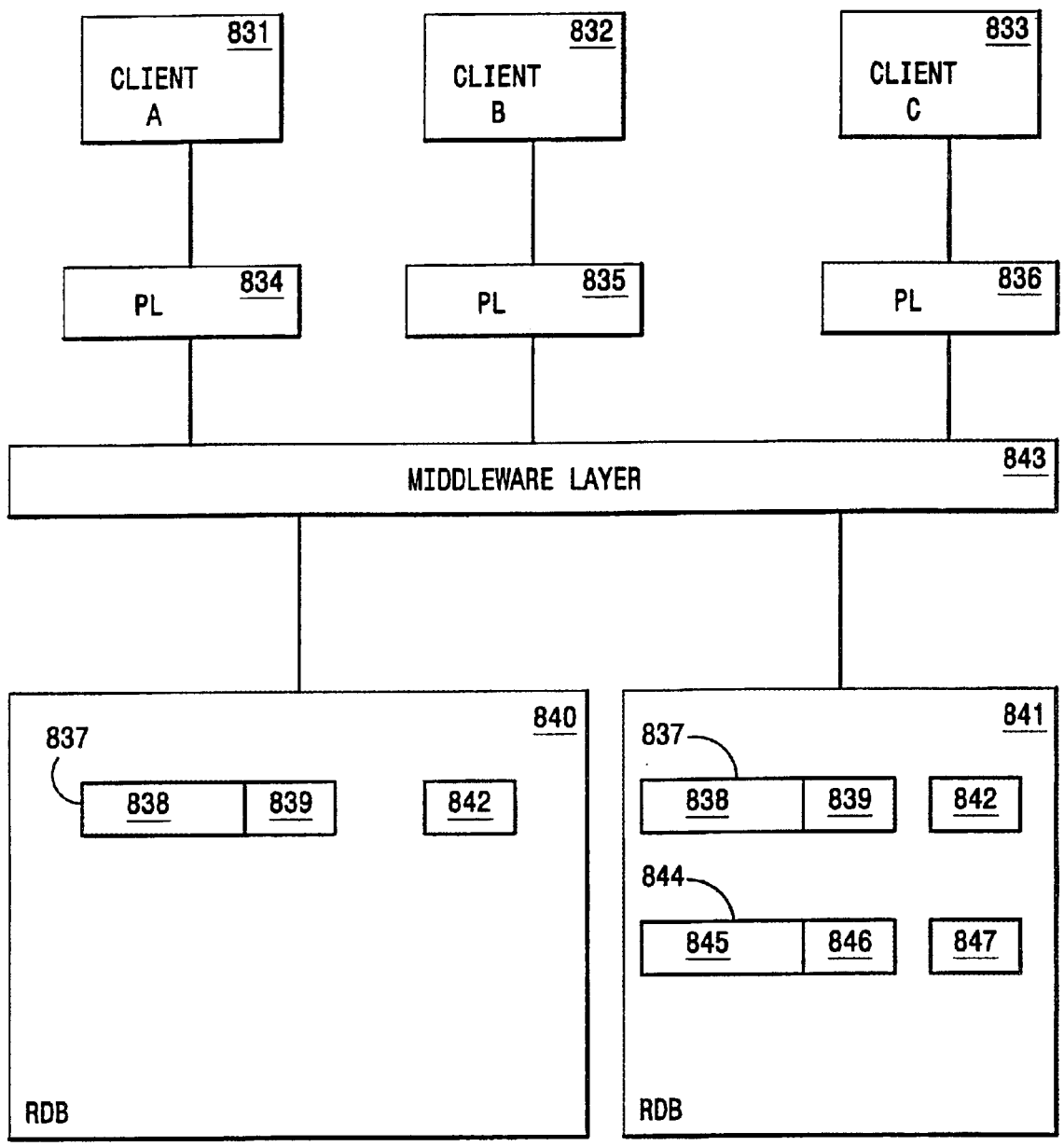
FIG. 8(c) is a block diagram illustrating attributes acting across the Internet.

FIG. 8(c) is a block diagram of the functional parts of the cluster class extending system of the present invention. Each of Clients A, B and C (831, 832, 833) are connected to a presentation layer (834, 835, 836) for their respective computers. Clients A and B are in the United States, while Client C is in Ireland. Each of Clients A, B and C have a namespace 837 containing a filename 838 and an attribute 839 in each of their relational databases 840, 841, with Clients A and B sharing a relational database 840 containing definition 842 of the cluster classification filenames 838 and attributes 839. A middleware layer 843 connects Client C to Clients A and B over the Internet. Client C is Ireland has his own relational database 841 containing namespace 837 and definition 842, but Client C also has namespace 844 with filename 845 and attribute 846 with definition 847. Client C has determined that namespace 844 is an especially good cluster classification for analysis of his semiconductor data, and Clients A and B in the United States wish to acquire it. Client C therewith sends namespace 844 to Clients A and B.

Figure 8D:
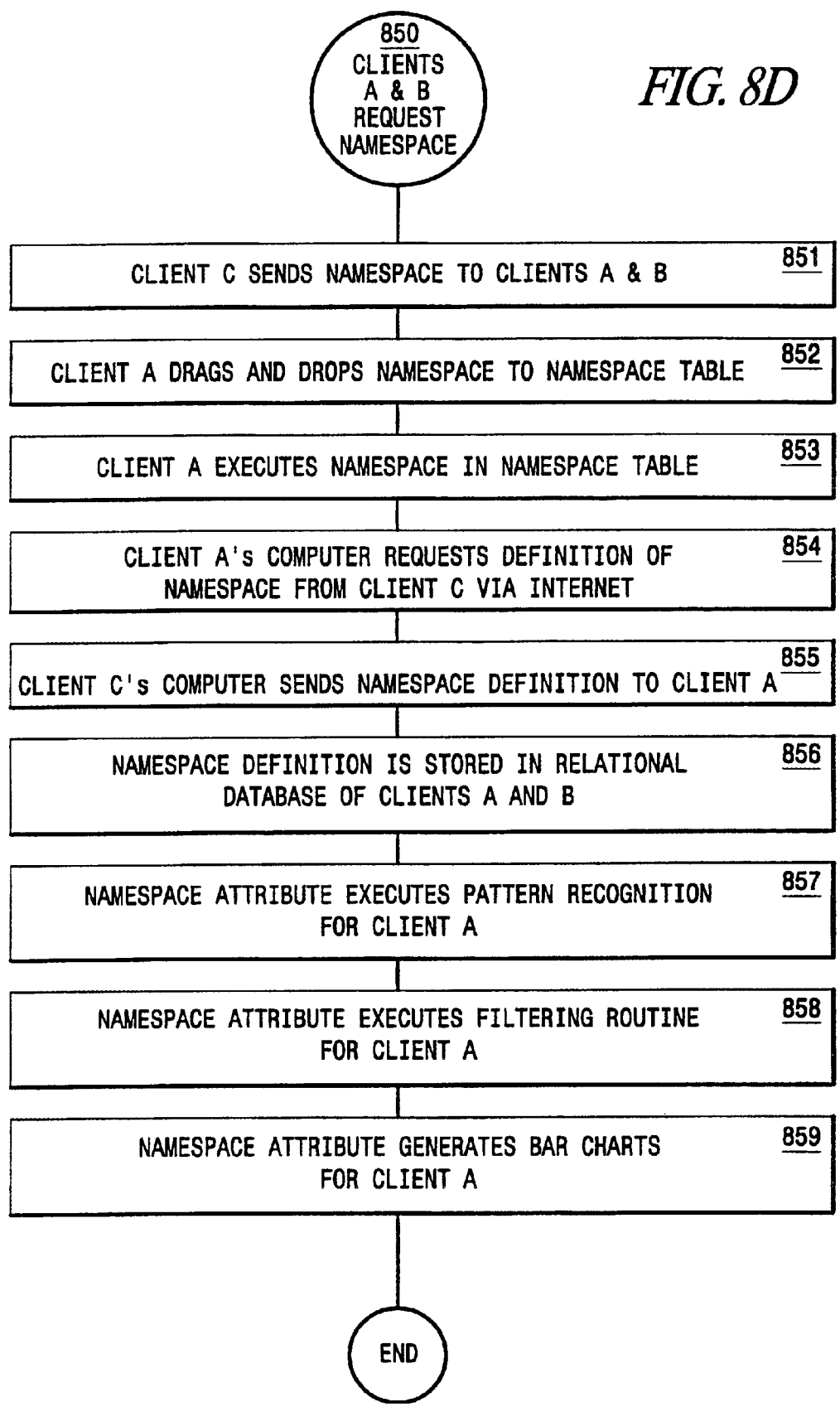
FIG. 8(d) is a flowchart showing attributes acting across the Internet.

FIG. 8(d) is a flowchart showing the what happens after Clients A and B initiate a request for namespace 844 (step 850) and Client C sends the namespace 844 to Clients A and B (step 851). Client A then drags and drops the new cluster classification 821 representing namespace 844 into his table namespace 810 (step 852). Client A executes namespace 844 by selecting cluster classification 821 (step 853). Namespace 844 has an attribute 846. Execution of namespace 844 with attribute 846 causes Client A's computer to request transmission of namespace definition 847 across the Internet (step 854) via middleware layer 843. Client C's computer sends this definition 847, which resides in Client C's relational database 841 to Client A (step 855) via middleware layer 843. Thereupon, definition 847 is placed in relational database 840 shared by Clients A and B (step 856). Attribute 846 also contains an extension that identifies the presence of the particular cluster classification 821 with an optical pattern recognition device and a neural network computer (step 857) and executes a particular filtering routine on the production data (step 858) to produce a data analysis chart (step 859).

The invention has been described above according to a preferred embodiment, but those having ordinary skill in the art should recognize that changes, substitutions and variations can be readily made without departing from the spirit of the invention. Accordingly, the invention is only construed to be limited by the claims set forth below.

We claim:

1. A method of analyzing semiconductor production data from a production line, comprising the steps of:
    establishing a table namespace of old semiconductor cluster classifications having first attributes;
    selecting from a list box a new semiconductor cluster classification having second attributes;
    adding said selected new cluster classification to said table namespace;
    choosing said new semiconductor cluster classification from said table namespace;
    executing an analytical routine on said production data from said new semiconductor cluster classification with said second attributes;
    choosing a plurality of filters associated with said old and new semiconductor cluster classifications;
    applying said plurality of filters to said semiconductor production data in sequence;
    removing non-defect semiconductor product data from said semiconductor production data;
    color coding each of said semiconductor cluster classifications so that said classifications can be more easily distinguished; and
    if results of the executed analytical routine exceed a predetermined control level, sending a command to the production line to initiate a process change.

2. The method of claim 1, said executing step further comprising at least one of:
    importing a namespace containing said second attributes for said new semiconductor cluster classification;
    performing a pattern recognition function for said new semiconductor cluster classification; and
    generating a graphical representation of said results of said analytical routine on said new semiconductor cluster classifications with said second attributes.

3. The method of claim 2, said importing step further comprising:
    importing said namespace across the Internet or a local network.

4. The method of claim 1, further comprising;
    displaying a plurality of graphical representations of said old and new semiconductor cluster classifications side by side.

5. The method of claim 1, wherein:
    said executing of said analytical routine includes generating information about said new semiconductor cluster classifications of defects.

6. The method of claim 5, wherein:
    said generating of information about said semiconductor cluster classifications of defects includes generating information about scratches, particles, pinholes and blowouts.

7. The method of claim 1, further comprising the step of:
    importing said new semiconductor cluster classifications across a server.

8. The method of claim 1, further comprising the step of:
    importing said new semiconductor cluster classification across the Internet.

9. A system for analyzing semiconductor production data from a production line, comprising:
    a table namespace of old semiconductor cluster classifications having first attributes;
    a list box containing a plurality of new semiconductor cluster classifications having second attributes;
    a first analytical routine for execution on said production data from at least one of said old and new semiconductor cluster classifications with said first attributes and second attributes, respectively; and
    a second analytical routine for applying a plurality of filters, associated with said old and new classifications, to said semiconductor production data in sequence, removing non-defect semiconductor production data from said semiconductor production data, and color coding each of said semiconductor cluster classifications so that said classifications are more easily distinguishable, and sending a command to the production line to initiate a process change if results of the second analytical routine exceed a predetermined control level.

10. The system of claim 9, said analytical routine further comprises at least one of:
    an importation of a namespace having said second attributes for said new semiconductor cluster classification;
    a pattern recognition function for said new semiconductor cluster classification; and
    a graphical representation of results of said analytical routine on said old and new semiconductor cluster classifications.

11. The system of claim 10, wherein:

said namespace is imported over the Internet or a local network.

12. The system of claim 9, wherein:

said analytical routine is one of a number, mean, or standard deviation of defects over a particular lot identification, layer number or time period.

13. The system of claim 9, further comprising:

a plurality of graphical representations of said old and new semiconductor cluster classifications displayed side by side.

14. The system of claim 9, wherein:

said analytical routine generates information about semiconductor cluster classifications of defects.

15. The system of claim 14, wherein:

said semiconductor cluster classifications of defects include scratches, particles, pinholes and blowouts.

16. A system for analyzing semiconductor production data from a production line, comprising:

table namespace means for storing and displaying old semiconductor cluster classifications having first attributes;

list box means for storing and displaying a plurality of new semiconductor cluster classifications having second attributes;

first analytical routine means for execution on said semiconductor production data from at least one of said old and new semiconductor cluster classifications with said first attributes and second attributes respectively;

second analytical routine means for applying a plurality of filters, associated with at least one of said old and new semiconductor cluster classifications, to said semiconductor production data in sequence;

means for removing non-defect semiconductor production data from said semiconductor production data;

means for color coding each of said semiconductor cluster classifications so that said classifications can be more easily distinguished; and means for sending a command to the production line to initiate a process change if results of the second analytical routine exceed a predetermined control level.

17. The system of claim 16, said analytical routine further comprises at least one of:

means for importing a namespace having said second attributes for said new semiconductor cluster classification;

means for performing pattern recognition for said new semiconductor cluster classification; and means for graphically representing results of said analytical routine on said old and new semiconductor cluster classifications.

18. The system of claim 17, wherein:

means for importing said namespace over the Internet or a local network.

19. The system of claim 16, wherein:

said analytical routine means executes an operation of number, mean, or standard deviation of defects over a particular lot identification, layer number or time period.

20. The system of claim 16, further comprising:

means for displaying side by side a plurality of said old and new semiconductor cluster classifications.

21. The system of claim 16, wherein:

said analytical routine means generates information about semiconductor cluster classifications of defects.

22. The system of claim 20, wherein:

said semiconductor cluster classifications of defects include scratches, particles, pinholes and blowouts.

23. The system of claim 16, further comprising:

means for importing said new semiconductor cluster classification across a server.

24. The system of claim 16, further comprising:

means for importing said new semiconductor cluster classification across the Internet.

* * * * *